No. 675,817. Patented June 4, 1901.
S. COOPER.
BICYCLE BELL.
(Application filed Feb. 23, 1897. Renewed Oct. 25, 1899.)
(No Model.)
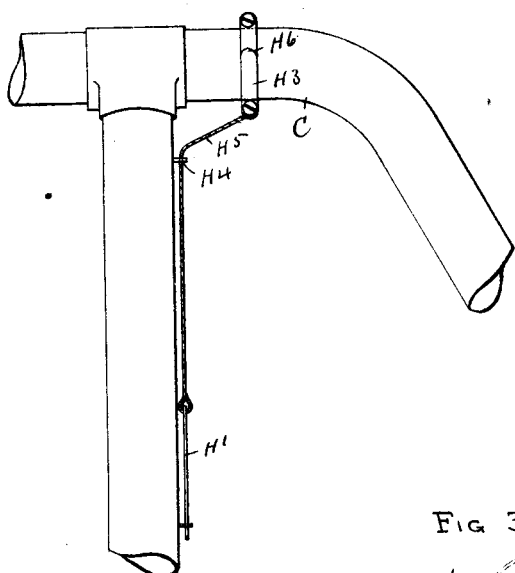
Fig. 1.
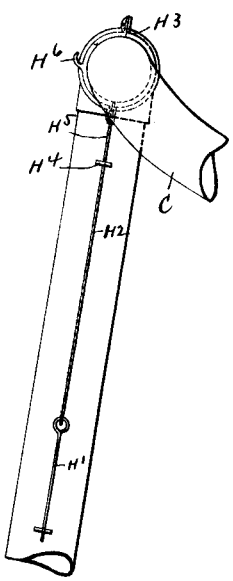
Fig. 2.
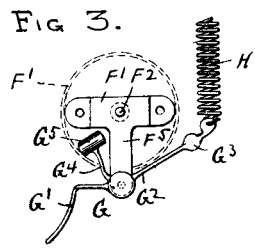
Fig. 3.
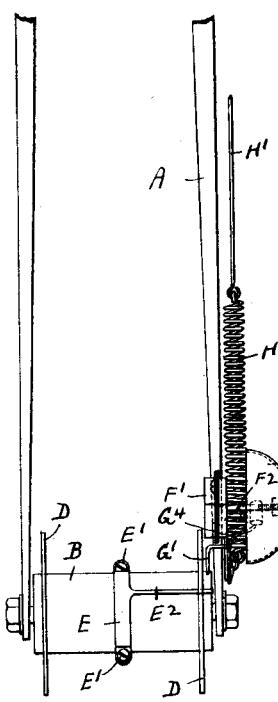
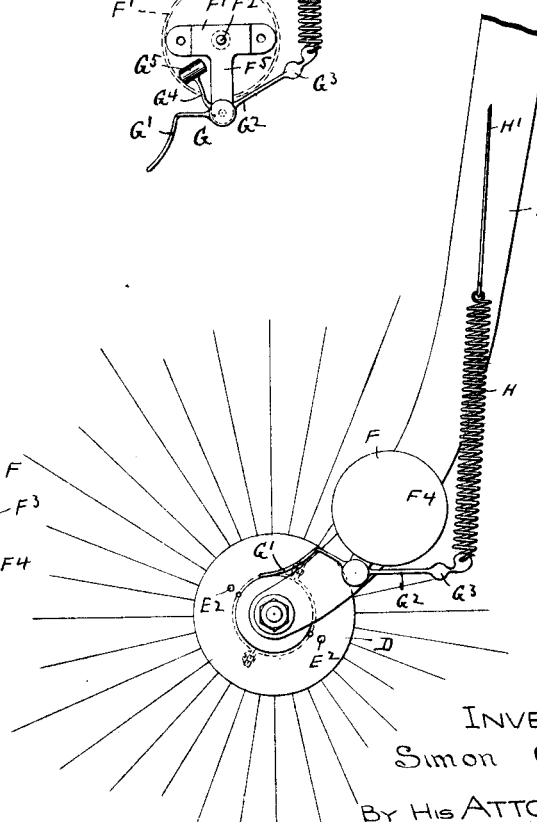
WITNESSES.
William Peters
M. C. Price
INVENTOR.
Simon Cooper
BY HIS ATTORNEY.
Rufus B. Fowler

UNITED STATES PATENT OFFICE.

SIMON COOPER, OF WORCESTER, MASSACHUSETTS.

BICYCLE-BELL.

SPECIFICATION forming part of Letters Patent No. 675,817, dated June 4, 1901.

Application filed February 23, 1897. Renewed October 25, 1899. Serial No. 734,778. (No model.)

*To all whom it may concern:*

Be it known that I, SIMON COOPER, a citizen of the United States, residing at Worcester, in the county of Worcester and State of Massachusetts, have invented a new and useful Improvement in Automatic Bells for Bicycles, of which the following is a specification, reference being had to the accompanying drawings, forming a part of the same, in which—

Figure 1 is a front view of a portion of a handle-bar and front fork of a bicycle having one of my improved automatic bells attached. Fig. 2 is a side view of the same, and Fig. 3 is a view of the bell detached from the fork with the dome of the bell indicated by broken lines.

Similar letters refer to similar parts in the different figures.

The object of my present invention is to provide for bicycles or other vehicles a bell capable of being rung automatically by the movement of the bicycle itself and of being thrown out of action at will; and it consists in the construction and arrangement of parts, as hereinafter described, and set forth in the annexed claim.

In the accompanying drawings I have represented my invention as applied to a bicycle; but it is equally applicable to other vehicles.

Referring to the drawings, A denotes a portion of the front fork, B a wheel-hub supported by the fork A, and C a portion of the handle-bar. The hub B is provided with flanges D D to receive the spokes of the wheel, and between the flanges D D is a circular band E, clamped upon the hub by means of screws $E'$. Projecting from the band E are prongs $E^2$, which extend laterally through one of the flanges D to the end of the hub. The number of these prongs may be varied, as desired. In the accompanying drawings two are shown placed upon diametrically opposite sides of the wheel-hub.

The bell F is attached to the fork A by means of the clip $F'$ in the usual manner. From one side of the clip $F'$ is a spindle $F^2$, having its end screw-threaded at $F^3$ to receive the dome $F^4$ of the bell. Extending downward from the clip $F'$ is an arm $F^5$, at the end of which is pivoted a three-armed lever G. The arm $G'$ of the lever projects forwardly and downwardly into the path of the prongs $E^2 E^2$. The arm $G^2$ of the lever extends rearwardly and is weighted at $G^3$.

The arm $G^4$ carries upon its end a bell-hammer $G^5$, arranged to strike against the inner side of the bell-dome by the oscillation of the three-armed lever G. To the end of the arm $G^2$, I attach a spiral spring H, extending upwardly at the side of the fork A and connected at its upper end by a rod $H'$ and a cord $H^2$ with a clip $H^3$, clamped upon the handle-bar C. The cord $H^2$ passes through an eye $H^4$, projecting from the side of the steering-head. The portion $H^5$ of the cord between the clip $H^3$ and the eye $H^4$ is raised and hung upon a hook $H^6$, projecting from the clip $H^3$, thereby lifting the arm $G^2$ and carrying the arm $G'$ down into the path of the prongs $E^2$, so that the three-armed lever will be oscillated by the rotation of the hub B, the lifting of the arm $G'$ being against the tension of the spring H, which returns the arm $G'$ into the path of the prongs $E^2$.

Whenever it is desired to throw the bell into action, that portion $H^5$ of the cord $H^2$ between the clip $H^3$ and the eye $H^4$ is raised and thrown over the hook $H^6$, and when it is desired to throw the bell out of action the cord $H^2$ is unhooked from the hook $H^6$, thereby removing the tension from the spring H and allowing the weight $G^3$ to carry the arm $G^2$ downward and lift the arm $G'$ out of the path of the prongs $E^2$.

The prongs $E^2$ serve as strikers against the arm $G'$, lifting the arm $G'$, which is reversed by the action of the spring H. Said spring is held expanded and under tension by raising the cord $H^2$ upon the hook $H^6$. I do not confine myself to a pair of prongs, such as $E^2$, as any suitable striking device carried by the rotating part of the vehicle can be employed.

The arm $G^4$, which carries the hammer $G^5$, is elastic, and the normal position of the hammer just clears the dome of the bell when the arm $G'$ is in its lowest position. When the arm $G'$ is lifted by one of the prongs $E^2$, the hammer $G^5$ is carried away from the dome of the bell, and when the arm $G'$ is released the tension of the spiral spring H reverses the motion of the three-armed lever with a sudden movement, causing the momentum of the hammer as it moves forward to overcome the elasticity of the arm $G^4$ and carry the hammer into contact with the dome of the bell. When the stroke of the hammer $G^5$ has been completed, the tension of the elastic arm $G^4$ removes the hammer out of contact in order to allow the free vibration of the dome of the bell.

What I claim as my invention, and desire to secure by Letters Patent, is—

In an automatic bell for bicycles, or other vehicles, the combination with the dome of a bell, of a three-armed pivoted lever, one of said arms adapted to be struck by a striker carried by the wheel of the vehicle whereby said lever is rocked in one direction, a second arm projecting beyond the dome of the bell and provided with a weight applied to rock said lever and carry it out of the path of the striker, a yielding connection between said second arm and the fixed framework of the vehicle, a third elastic, or yielding, arm and a hammer carried by said elastic, or yielding arm, substantially as described.

Dated this 20th day of February, 1897.

SIMON COOPER.

Witnesses:
RUFUS B. FOWLER,
M. C. PRICE.